United States Patent [19]

McLafferty

[11] Patent Number: 4,931,639

[45] Date of Patent: Jun. 5, 1990

[54] MULTIPLICATION MEASUREMENT OF ION MASS SPECTRA

[75] Inventor: Fred W. McLafferty, Ithaca, N.Y.

[73] Assignee: Cornell Research Foundation, Inc., Ithaca, N.Y.

[21] Appl. No.: 241,869

[22] Filed: Sep. 8, 1988

Related U.S. Application Data

[63] Continuation of Ser. No. 239,423, Sep. 1, 1988, abandoned.

[51] Int. Cl.[5] ........................ H01J 49/00; B01D 59/44

[52] U.S. Cl. ........................................ 250/282; 436/173

[58] Field of Search ........................... 250/282; 436/173

[56] References Cited

U.S. PATENT DOCUMENTS

| | | | |
|---|---|---|---|
| 3,955,891 | 5/1976 | Knight et al. | 356/74 |
| 4,056,725 | 11/1977 | Kamburov et al. | 250/336 |
| 4,105,916 | 8/1978 | Siegel | 250/282 |
| 4,472,631 | 9/1984 | Enke et al. | 250/281 |
| 4,583,183 | 4/1986 | Winiecki et al. | 364/498 |

OTHER PUBLICATIONS

McLafferty et al., Anal. Chem., 59, Sep. 1, 1987, pp. 2212-2213.

McLafferty et al., International Journal of Mass Spec. and Ion Processes, 72(1986), pp. 85-91.

Cody et al., Proc. Natl. Acad. Sci. USA, vol. 82, pp. 6367-6370, Oct. 1985.

Pfandler et al., Chem. Physics Letters, vol. 138, No. 2, 3, Jul. 17, 1987, pp. 195-200.

Busch et al. in *Tandem Mass Spectrometry;* McLafferty, Ed., 1983, pp. 11-39.

Marshall et al. in *Transform Techniques in Chemistry;* Griffiths, Ed., 1978, pp. 39-68.

French et al. in *Tandem Mass Spectrometry;* McLafferty, Ed., 1983, pp. 353-370.

McLafferty et al., "Mass Spectrometric Analysis", Anal. Chem., 31, Jul. 1959, pp. 1160-1163.

Kelley et al., *Adv. Mass Spectrom.,* 1985, 10, pp. 869-870.

Coutant et al., Int. J. Mass Spectrom., Ion Phys., 8(1972), pp. 323-339.

McLafferty et al., J. Chem. Inf. Comput. Sci., vol. 25, No. 3, 1985, pp. 245-252.

"Two-Dimensional Fourier Transform Ion Cyclotron Resonance Mass Spectrometry" Pfandler et al., *Chemical Physics Letters,* vol. 138, No. 2, 3 Jul. 17, 1987, pp. 195-200.

"Peptide Mixture Sequencing by Tanden Fourier--Transform Mass Spectrometry" Cody, Jr. et al. *Proc. Natl. Acad. Sci., USA,* vol. 82, Oct. 1985, pp. 6367-6370.

"Tandem Fourier-Transform Mass Spectrometry", Fred W. McLafferty et al., *Int. Journal of Mass Spectrometry and Ion Processes,* 72 (1986), 85-91, pp. 85-91.

"Retrieval and Interpretative Computer Programs for Mass Spectrometry" Fred W. McLafferty et al., *Journal of Chemical Information and Computer Sciences,* 1985, 25, 245.

"Automated Acquisition of Metastable Ion Data Using an On-Line Computer With Feedback Control", Coutant et al., *International Journal of Mass Spectrometry and Ion Physics,* 8 (1972), 323-339.

"Multichannel Methods in Spectroscopy", Marshall et al., pp. 39-69.

"Analytical Applications of Tandem Mass Spectrometry", Busch et al., pp. 11-39.

"Trace Monitoring by Tandem Mass Spectrometry", French et al., pp. 353-370.

"New Advances in the Operation of the Ion Trap Mass Spectrometer", P. E. Kelley et al., pp. 869-870.

*Primary Examiner*—Jack I. Berman

*Attorney, Agent, or Firm*—Jones, Tullar & Cooper

[57] ABSTRACT

A method for increasing the signal to noise and/or the speed of data collection for obtaining a collective secondary ion spectrum from selected combinations of primary ions is disclosed. The multiplicative capability of dissociating any combination of parent ions to form the collective secondary ion spectrum different combinations, each incorporating approximately ½ of the parent ions in a sample are measured in each cycle of measurement, and n collective spectra are obtained for n parent ions. The individual contributions at each specific mass in each secondary ion spectrum are calculated from the n simultaneous equations representing the summed intensity values at each mass.

5 Claims, 3 Drawing Sheets

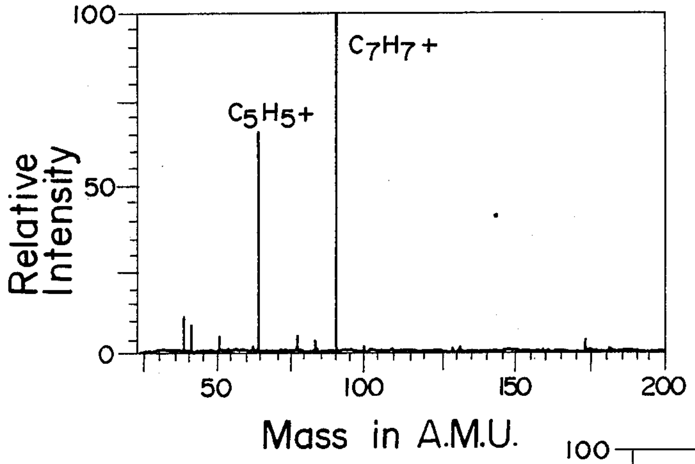
FIG. 4a
FIG. 4b
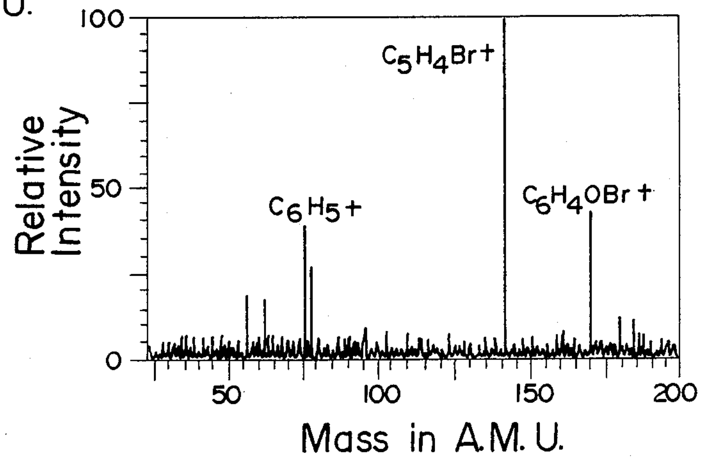
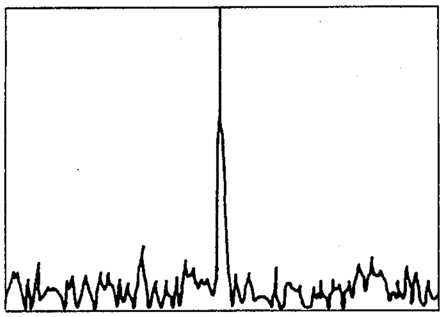
FIG. 5a
FIG. 5b
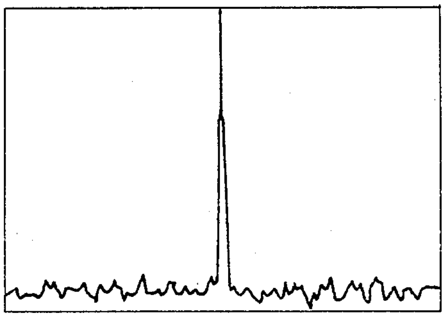

MULTIPLICATION MEASUREMENT OF ION MASS SPECTRA

BACKGROUND OF THE INVENTION

This invention was made with Government support under Grant No. CHE-8303340 awarded by the National Science Foundation and under Grant No. DAA-LO3-86-KO088, awarded by the Army Research Office. The Government has certain rights in the invention.

This application is a continuation of application Ser. No. 07/239,423, filed Sept. 1, 1988 and entitled "Multi-Channel Measurement of Mass Spectra", now abandoned.

The present invention relates, in general, to the analysis of molecular samples, and more particularly to a method of mass analysis of such samples through ion masking techniques which select multiple combinations of primary ions to be measured, dissociation or reaction of such ions to produce secondary ions, measurement of the secondary ions, including measurement through the use of multi-channel detectors, with the measurements being repeated using multiple masks for different selected combinations of masses of primary ions, and through calculations based on the measured secondary ion masses.

The further charaterization of individual primary ions of a normal mass spectrum through their secondary product ions is often called tandem mass spectrometry, or MS/MS. In conventional tandem mass spectrometry, the analysis of a sample material is time consuming and wasteful of both energy and material, since only a single primary ion from the sample can be selected at a time for analysis, and any nonselected ions in the sample are lost. In order to analyze the sample completely, the mass selection of conventional spectrometers is changed as a function of time, so that higher and higher masses are selected for measurement of their secondary mass spectra. Over a period of time, the entire primary spectrum of the target is then selected.

Improvements over this conventional approach are possible in some instruments through the use of multiplicative dissociation of the primary ions. An example of such a technique is the use of ion cyclotron resonance instruments, wherein ions from a sample are captured in a cell with high magnetic field. An RF field excites the ions into cyclotron orbits. The frequencies of the orbits are a function of their mass, and by detecting the frequencies produced in the cell by the ions, an output signal representing the spectrum of the ion masses is obtained. A Fourier analysis of this output signal provides all of the component frequencies, and thus provides a measure of the ion masses present in the target sample. This allows detection of all ions simultaneously, rather than as a function of time. In the reverse of this, by choosing the correct RF frequencies, any combination of these primary ions can be mass selected to remain in the cell for dissociation or reaction. Such a primary ion selection is possible also with the ion trap instrument.

As is well known, Fourier transform mass spectrometry (FTMS) can be used to measure simultaneously all of the ions which are selected, resulting in enhanced sensitivity for the collection of mass spectra. The multichannel detection capability of FTMS makes possible the collection of a complete secondary ion spectrum of a single parent ion, with nearly the same efficiency as the detection of a single one of the secondary ions. Typically, in such applications of FTMS, only one parent ion is selected for dissociation although one advantage of FTMS over scanning instruments is that a number of primary ions can be selected and dissociated simultaneously. The present invention takes advantage of this multiplicative dissociation capability of FTMS. However, even though Fourier transform techniques produce significant improvements, they still lack the sensitivity and, therefore, the accuracy required in many applications of MS/MS analysis.

SUMMARY OF THE INVENTION

The present invention is directed to a technique of analyzing samples utilizing multiple masking wherein each masking step selects a plurality of ions, and wherein the multiplicity of masking steps permits a signal analysis to obtain individual mass spectra of each precursor ion. For each spectrum this significantly increases the signal to noise ratio and thus the accuracy and reliability of the measurements obtained so that a rapid analysis of a sample material can be obtained. The analysis of multiple signals may be performed through the use of a Hadamard transform technique which provides a simultaneous solution to multiple equations to thereby determine the mass and abundance of each of the constituent secondary ions from each primary ion from the sample molecules so that rapid and reliable identification of the sample material can be made.

In accordance with the present invention, molecular samples are analyzed through the use of tandem mass spectrometry. The method includes the production of primary gaseous ions from a molecular sample and mass selecting different combinations of those primary ions. The selected ions are reacted, for example by collisionally activated dissociation, to obtain from each of the primary ions a multiplicity of secondary, or daughter ions, of masses different than the masses of their parent, or primary ions. The secondary ions are then separated in accordance with their masses, and the abundances of the secondary ions are measured to obtain a mass spectrum of the secondary ions. This process is repeated to select different combinations of primary ions, with the process being repeated the same number of times as there are primary ions, in the preferred form of the invention. Upon completion of this process, the abundance of each secondary ion arising from the reaction of each primary ion is calculated by analyzing the yields of secondary ions from each combination of primary ions. Based on these yields, the constituents of the molecular sample can be identified with considerable accuracy and reliability. This reliability is enhanced by the fact that the repetitive measurements of different combinations of primary ions enhance the signal to noise ratio, allowing a signal gain in measuring n primary ions of n/4, as compared to other techniques of analysis, or what is the same, a gain in the speed of calculation of n/4.

Apparatus for carrying out this analysis may include, for example, a source of gaseous ions having a mixture of n different ions. These ions are passed through a first mass spectrometer for a first mass analysis of the primary ions and a predetermined number of these mass separated ions are selected. For example, if there are n primary ions, n/2 of these ions may be selected. The selected primary ions are dissociated as by means of a collisionally activated dissociation reaction. All, or in some cases selected, secondary ions are then mass-separated by means of a second mass spectrometer; the resulting mass spectrum represents the combination of the mass-separated secondary ions for each primary, or parent, ion. This process is then repeated for another combination of primary ions, again selecting a different 50% of the primary ions, and the mass yields are again obtained. This is repeated the same number of times as there are ions, so that if there are 100 different ions in the sample, the measurement will be repeated 100 times, each time selecting a different combination of primary ions. For each of the 100 different measurements the secondary ion yield for each ion mass value is obtained, and through analysis of these yields, the secondary ion yields for each of the 100 primary ions can be determined. Such an analysis involves the solution of n simultaneous equations, and this solution can be performed, for example, by the use of a Hadamard transform.

In a particular application of the present invention, the separation of primary ions is carried out by radio frequency excitation of a sample at mass-specific frequencies either to select the ions that will pass through the measurement system or to select those that will be eliminated. Similarly, if not all of the secondary ions are to be mass-selected, RF excitation can be used to select the secondary ions that will be measured. These mass-selections operate as electronic masks for the ions which are to be measured. An ion trap instrument can be used for this process to trap the primary ions. Excitation of the instrument forces selected ions out of the stability region and removes them from the trapping region to obtain the primary mass spectrum.

The mass-selected secondary ions can be detected in a number of ways. For example, ions in cyclotron orbits induce image currents in detector plates, with the frequency of the image currents being dependent on the mass to charge ratio of the ion (m/z) and on the magnetic field. Detection of the ions in most other mass spectrometers is accomplished when the ions strike a surface; for example, in a Faraday cage the positive ions cause the flow of corresponding electrons in the circuit while in an electron multiplier, the ion strikes the surface with sufficient velocity to desorb several electrons which are then accelerated to repeat the process to effect multiplication. Accordingly, any one of a variety of detection techniques can be used in the present invention.

BRIEF DESCRIPTION OF THE DRAWINGS

The foregoing, and additional objects, features and advantages of the present invention will become apparent to those of skill in the art from a consideration of the following detailed description of a preferred embodiment thereof, taken in conjunction with the accompanying drawings, in which:

FIGS. 4*a* and 4*b* show the secondary spectra produced by this method from two selected primary ions; and FIGS. 5*a* and 5*b* show the spectra produced from a specific primary ion by (a) measuring the secondary spectra of this mixture individually and (b) measuring them using the same number of primary ions (same ionization time) with the multiplicative method.

DESCRIPTION OF PREFERRED EMBODIMENTS

Figure 1:
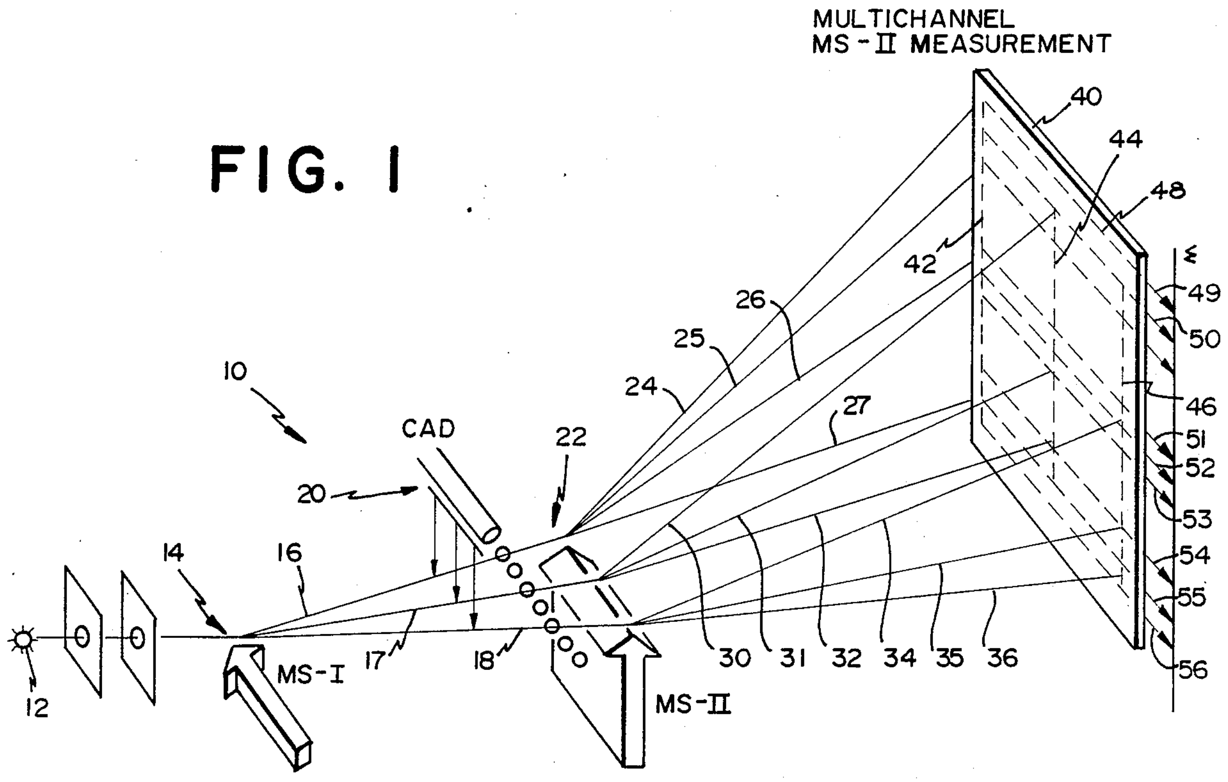
FIG. 1 is a diagrammatic illustration of the mass spectrometer of the present invention.

Referring now to FIG. 1, there is illustrated at 10 in diagrammatic form a tandem mass spectrometer for use in performing the method of the present invention. In the illustrated example, a mixture 12 of ions to be analyzed is supplied to a first conventional mass spectrometer 14 where the sample is separated by mass into a multiplicity of primary ions. The first mass spectrometer 14 (identified as MS-I) is energized to mass-select only those ions which are to be analyzed, indicated by the exemplary lines 16, 17 and 18, thereby serving as a first mask for the system. In a preferred form of the invention, the first stage spectrometer 14 selects about 50% of the ions in the mixture 12, with the ions of each mass value so selected travelling along corresponding paths 16, 17, 18, etc.

After separation at the stage 14, the selected ions are directed through apparatus for dissociating, or reacting, the primary ions to produce a multiplicity of corresponding secondary ions. Such apparatus is generally indicated at 20 and produces a collisionally activated dissociation reaction in the ions. Such dissociation reactions are well known, and thus the CAD reaction is shown only diagrammatically at 20. The stream of secondary, or daughter, ions produced by the dissociation reaction are supplied to a second mass spectrometer stage generally indicated at 22. Again, this stage is a conventional mass spectrometer (MS-II) which operates on each stream of secondary ions formed in the corresponding paths 16, 17, 18, etc. to mass-select the secondary ions. Thus, for example, all, or if desired only selected ones of the daughter ions produced from the primary ions following path 16 are separated at MS-2 into a plurality of secondary paths schematically represented at 24, 25, 26, 27, etc., the number of paths depending upon the number of different mass values selected from the secondary, or daughter ions. In similar manner, the stream of daughter ions in path 17 following the collisionally activated dissociation reaction are separated at the MS-2 stage 22 into corresponding secondary paths schematically represented by paths 30, 31 and 32 and the stream of secondary ions following path 18 are separated into corresponding schematically illustrated secondary paths 34, 35 and 36.

The secondary paths 24, 25, 26 and 27 represent the spectrum of secondary ions obtained through the mass spectrometry which occurs at stage 22 and thus serves to mass-separate the secondary ions in the stream of path 16. These secondary ions are detected by a suitable detector indicated diagrammatically at 40. This detector can be any one of numerous conventional detectors for mass spectrometers; for example, multichannel, as shown, for ICR, but scanning for the ion trap. The detector accumulates, for example, a charge representing the accumulated ions following the path 24, another charge representing the ions accumulated along the path 25 and so on. These secondary ions from the primary ions of path 16 are detected along the vertical line 42 of detector 40. In similar manner, the detector accumulates along vertical line 44 the charges representing the abundance of ions following path 30, the charges representing the abundance of ions following the path 31, the charges representing the abundance of ions following path 32. Similarly, charges are accumulated along vertical path 46 representing the abundances of ions following paths 34, 35 and 36. Most importantly, however, in MS/MS instruments such as the ICR and ion trap the schematic detector paths discussed above are only separated in time, not space, representing use of the same detector system at a different time. Thus, if the primary ions from paths 16, 17 and 18 are dissociated simultaneously, the simultaneous recording of their secondary ions is shown schematically at vertical line Σ. The secondary ions produced from the primary ions along paths 16, 17 and 18 may all be different; however, in some instances secondary ions produced from different primary ions may have the same mass. In the diagrammatic illustration of FIG. 1, the detector 40 is shown has having received secondary ions of some nine different mass values, as indicated by the horizontal lines 48 through 56. In accordance with the present invention, the individual mass values accumulated by the detector 40 are summed to produce a value, or yield, for each mass value (represented by the horizontal lines 48–56) detected for the originally-selected primary ions. This gives a distribution by mass of the secondary ions present in those selected primary ions. The accumulation of these mass yields for the initially selected primary ions completes a first cycle of measurements.

In a second cycle of measurements, a different combination of primary ions are selected from the mixture 12 of sample ions. Again, approximately 50% of the ions present in the sample are selected by the mass spectrometer at station 14, and these primary ions pass along paths similar to the paths 16, 17, 18, etc. and through a collisionally activated dissociation reaction at station 20 to produce corresponding streams of secondary ions along these paths. The stream of secondary ions are then supplied through a second stage mass spectrometer at station 22 to produce a secondary ion mass distribution for each of the selected primary ions represented by vertical lines such as the lines 42, 44 and 46 at detector 40. Again, the accumulated ions at each mass value are recorded together to produce mass yields for the second set of primary ions shown at vertical line Σ, completing a second cycle of measurements. Third and succeeding cycles similarly select different sets of primary ions, each time selecting a different combination of approximately 50% of the available ions in the sample, and the mass yields are obtained. These measurements are made through the same number n cycles as there are ions in the sample 12; thus, for example if there are 100 different ions in the sample, 100 measurement cycles are performed to obtain 100 different sets of mass yields. From these yields, the constituents of the 100 different. ions in the sample can be calculated through the use of simultaneous equations. This produces a gain in signal level, or in speed, of n/4 so that where there are 100 ions in the sample, the determination of the sample content can be made 25 times faster than with the prior analytical method of measuring the spectra of the 100 primary ions individually. The solution of the n simultaneous equations that are produced in the n cycles can be accomplished through the Hadamard transform.

The advantages of the foregoing technique for analyzing a mixture through dissociation of different combinations of parent ions is evident from a comparison of the process required previously, where to examine all primary ions to find which one or ones are parents of a specific secondary ion it is necessary to separate and dissociate each of n parent ions individually while making n measurements of specific secondary ion intensity. However, through the use of the present invention with Fourier transform multi-channel selection, the n measurements of secondary ion intensity can instead be made by dissociating different combinations of parent ions and solving the n simultaneous equations representing the summed intensity values for the primary ions. This yields the secondary ion spectrum for each of the specific primary ions of interest. The abundance value of each secondary ion provides a factor of n/4 (for large values of n) in signal to noise improvement, as opposed to separate parent ion measurement. Furthermore, by using the multi-channel advantage of Fourier transform mass spectrometry, the complete secondary ion spectrum of a selected parent ion can be collected with almost the efficiency of measuring a single one of its secondary ions. From the complete secondary ion spectra for the n mass combinations, the primary ion spectra for all of the secondary ions can be calculated.

Because the absolute error in measuring a spectral peak depends upon the abundance of the ion, the accuracies for small primary ion peaks are reduced by an increased number of large primary ion peaks. This effect is known as "shot noise", and this noise from other parent ions will, on average, reduce the advantage provided by the present invention for measuring a specific secondary ion when a large number of primary ions are its parents. If the parent ion spectra of a limited number of secondary ions are desired, only those primary ions which are possible as parents need be used for the collective secondary ion spectra.

Constant neutral loss spectra are measured by conventional scanning instruments, by scanning with tandem mass spectrometers using a constant mass difference, d. If parent ions exhibiting several specific losses are sought, several scans are required. Using the technique of the present invention, on the other hand, constant neutral loss spectra can be measured for any number of d values by measuring the collective secondary ion spectrum for all parent ions, but selecting those parent ions which differ by the d values from the secondary ions, and thereafter solving simultaneous equations through the use, for example, of the Hadamard transform process.

The present invention permits continuous monitoring for a large number of preselected compounds, such as pollutants, drugs, or explosives, end this monitoring can be performed with high selectivity and sensitivity. If a "soft" ionization of the unknown sample produces one or more primary ion peaks at mass levels which correspond to the ion masses expected for one or more target compounds, then the corresponding secondary ion spectrum is measured for the ions at those peaks to confirm or exclude the presence of the target compound. However, sampling under conditions of high contamination, such as smoke or a deliberate adversial obfuscation, could result in a large number of primary ion peaks, thereby requiring the measurement of the secondary ion spectra of many primary ions, some of which would be false alarms. Such false alarms rapidly erode the credibility of the system; thus a mass spectrometry system capable of monitoring for up to 100 toxic agents would also require the efficient measurement of about 100 secondary ion spectra. The present invention would permit such measurements 25 times faster than would be possible with prior individual ion measurement system.

EXAMPLE

Figure 2:
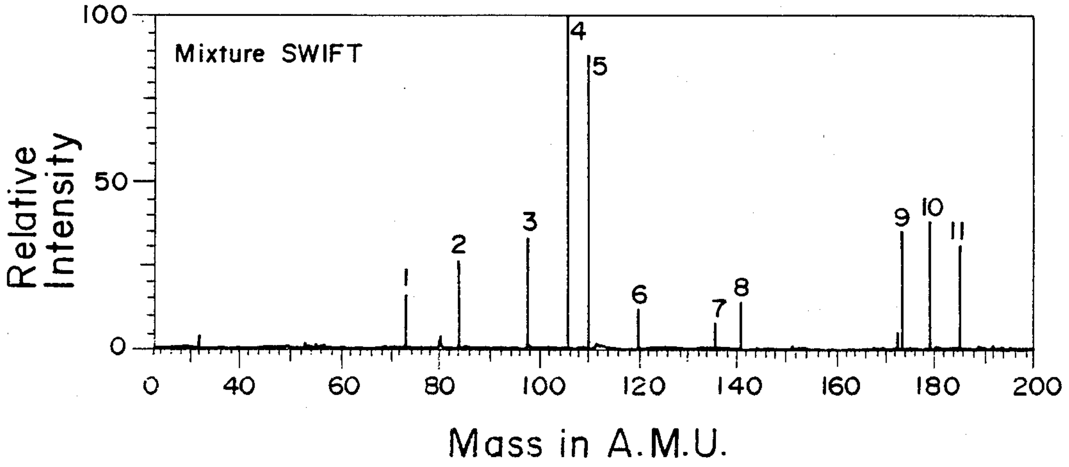
FIG. 2 is an example of the spectrum produced by ionization of a mixture of 11 compounds.
Figure 3A:
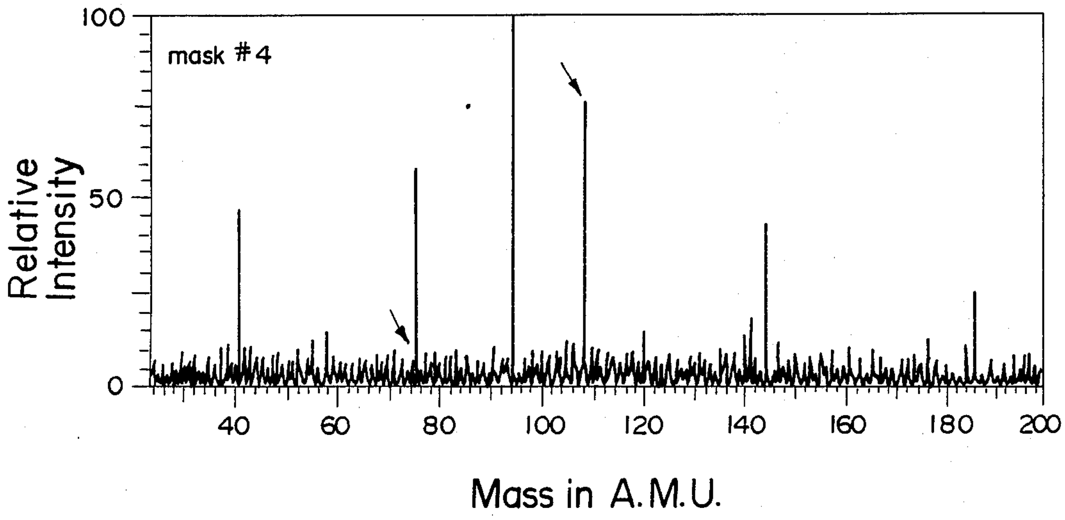
FIGS. 3*a* and 3*b* show the spectra from collisionally activated dissociation of selected ions from the FIG. 2 mixture.
Figure 3B:
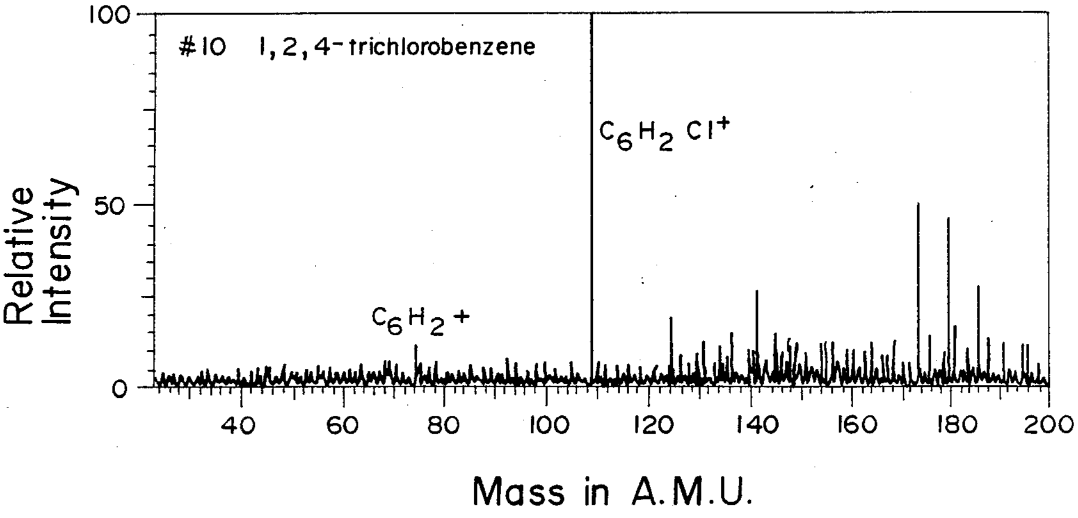

This method has been applied to a mixture of 11 compounds using a Nicolet FTMS-2000 mass spectrometer. A SWIFT waveform (See: Chen, L.; Wang, T-C. L.; Ricca, T. L.; Marshall, A. G. *Anal. Chem.* 1987, 59, 449–454) was used to selectively isolate the li molecular ions formed by electron ionization using 14 eV electrons (FIG. 2). Different combinations of 6 parents were selected using Hadamard masks, excited, and allowed to undergo collisionally activated dissociation (CAD) using a pulsed valve and nitrogen. FIG. 8 shows the combined (masked) CAD spectra of compounds, 1,2,3,7,9, and 10. By stopping the Hadamard transform before completion (at m/z 124), the enhancement in S/N of the MS-II spectra is easily seen (FIG. 3*b*); m/z <124 corresponds to the CAD spectrum of compound 10 and m/z >124 corresponds to one of the masked (combined) CAD spectra. After completion of the transform, the $C_6H_2^+$ ion (m/z 74) from 10 is readily apparent (FIG. 3*b*), and daughter ion spectra for each of the precursors are obtained (FIG. 4*a, b*). A S/N enhancement of 2.4 is achieved over spectra measured individually under identical conditions (FIG. 5). The Hadamard method of multiplexing yields the greatest advantage with large numbers of precursor ions. Thus, daughter ion spectra of 100 precursors can be collected in 1/25 the time.

The Hadamard transform method can be extended to $MS^n$ experiments. For $MS^3$, masks are applied to both p MS-I and i MS-II ions to produce pi MS-III combination spectra. Again, individual MS-III spectra are extracted from the different combinations of Hadamard masks and results in a $(p.i)^{0.5/4}$ enhancement in S/N. This method is compatible with alternate methods of ion dissociation, including photodissociation, and can also be used for studying numerous ion-molecule reactions simultaneously.

The calculations for carrying out the method described above may be described in general terms as follows:

The number of parent ions is best chosen to be $(4*i-1)$ where i is an integer. This is because the matrices that are used to multiplex the ions do not exist for all values of n. Once n has been chosen, the n x n matrix (called an 'S' matrix) must be determined. For example, the S matrix for 7 parent ions is:

```
S = 1 1 1 0 1 0 0
    1 1 0 1 0 0 1
    1 0 1 0 0 1 1
    0 1 0 0 1 1 1
    1 0 0 1 1 1 0
    0 0 1 1 1 0 1
    0 1 1 1 0 1 0
```

Each row of the S matrix corresponds to a combination of parent ions to be dissociated and measured. The 1 designates an ion to be excited, 0 designates a parent ion left out. In this case, the daughter spectra of 7 parent ions are measured by selecting 7 separate combinations of 4 parent ions.

A measurement (M) is then:

$$M(n)=S(n,n)*T(n)+E(n)$$

where T is the 'true' value and E is the random error associated with a measurement.

To unmultiplex the measurements, multiply M by the inverted S matrix:

$$U(n)=S^{-1}(n,n)\ M(n)$$

A Fortran program for generating the first row elements of the S matrix takes the following form, it being noted that S matrices are simplest to generated and use if they are cyclic; that is, row k is row k−1 shifted by one position.

```
c       < generate the first row of a cyclic S matrix by
c       the quadratic residue method >
        program generate_s
c       < this must be an allowed S matrix dimension,
        and c a prime number >
        parameter (N = 7)
        integer num(1000)
        integer first_row(N)
c       < generate the numbers 1,4,9 . . . ((N-1)/2**2 >
        do i = 1, (N-1)/2
        num(i) = mod(num(i),N)
        end do
c       < generate the first row elements of S >
        first_row(1) = 1
        do i = 1, N
        first_row(num(i) + 1) = 1
        end do
        write (*,9000) first_row
9000    format (10i3)
        end
```

A Fortran program for inverting an S matrix takes the following form:

```
c       < invert an S matrix >
        subroutine invert_s(s,n)
        real s(n,n)
c       < transpose S >
        do 100 i = 1, n
        do 100 j = 1, i
        temp = s(i,j)
        s(i,j) = s(j,i)
        s(j,i) = temp
100     continue
        do i = 1, n
        write (*,*) (s(i,ii),ii = 1,n)
        end do
        do 110 i = 1 , n
        do 110 j = 1 , n
        if (s(i,j) .eq. 1) then
        s(i,j) = 2./(n + 1)
        else
        s(i,j) = -2./(n + 1)
        endif
110     continue
        end
```

The Hadamard transform can be carried out with the following program: This is a 'slow' transform - a simple $O(n^2)$ matrix multiplication. There is a FHT[2] which calculates a Hadamard transform $O(n\log(n)+2n)$, which will speed up the transform for large n.

```
parameter (N = 7)
real inverse_s(N,N)
real m(n)             !measured values
real u(n)             !solved values
.
.
.
do i = 1 , N
sum = O.
```

-continued

```
do j = 1 , N
sum = sum + inverse_s(i,j) * m(j)
end do
u(i) = sum
end do
.
.
.
```

Thus, there has been illustrated a unique method for analyzing a sample material through the generation of primary ions and secondary ions, sampling through an electronic mask different combinations of primary ions, and determining the abundance of secondary ion masses in each combination and, through the use of a Hadamard transform, for example, solving simultaneous equations for determining the sample content. Although the invention has been described in terms of preferred embodiment, it will be understood that variations may be made without departing from the true spirit and scope thereof, as set forth in the following claims:

What is claimed is:

1. A method of analyzing molecular samples, comprising:

producing a plurality of n different primary gaseous ions from a molecular sample;

mass-selecting a first combination of about 0.5n of said n primary ions;

dissociating the selected primary ions to form from each selected primary ion a corresponding stream of secondary ions of masses different than the mass of the primary ion producing said stream;

mass-selecting the secondary ions in each stream of secondary ions;

measuring the abundances of secondary ions produced by all of said streams to obtain the mass spectrum of said secondary ions for said first combination of primary ions;

repeating the steps of mass-selecting a combination of about 0.5n of n primary ions from said sample, dissociating the selected primary ions to form corresponding streams of secondary ions, mass-selecting the secondary ions and measuring the abundances of secondary ions, each of a plurality of different combinations of primary ions, each selected combination being different than prior selected combinations, to obtain the mass spectra of secondary ions for each different combination of primary ions; and determining from said secondary ion spectra for all of said plurality of combinations of primary ions, the abundance of each secondary ion produced from the dissociation of said primary ions to thereby identify the primary ions in the molecular sample.

2. The method of claim 1, wherein the process steps of mass-selecting combinations of primary ions are repeated as many times as there are primary ions.

3. The method of claim 2 wherein the step of determining from the secondary ion spectra the abundance of each secondary ion is carried out through a Hadamard transform.

4. The method of claim 2, wherein the step of determining from the secondary ion spectra the abundance of each constituent secondary ion includes providing and solving simultaneous equations, there being one equation for each of said primary ions.

5. The method of claim 1, wherein the steps of mass-selecting combinations of primary ions, dissociating mass-selecting secondary ions, and measuring the abundances of secondary ions are repeated n times, whereby the signal to noise ratio for the analysis is improved by n/4.

* * * * *

UNITED STATES PATENT AND TRADEMARK OFFICE
CERTIFICATE OF CORRECTION

PATENT NO. : 4,931,639

DATED : June 5, 1990

INVENTOR(S) : McLafferty

It is certified that error appears in the above-identified patent and that said Letters Patent is hereby corrected as shown below:

Column 10, line 32:

Claim 5, line 2, after "dissociating" insert a comma (--,--).

Signed and Sealed this

Twenty-third Day of July, 1991

Attest:

HARRY F. MANBECK, JR.

*Attesting Officer*

*Commissioner of Patents and Trademarks*